United States Patent [19]

Yamada et al.

[11] Patent Number: 5,797,116
[45] Date of Patent: Aug. 18, 1998

[54] METHOD AND APPARATUS FOR RECOGNIZING PREVIOUSLY UNRECOGNIZED SPEECH BY REQUESTING A PREDICTED-CATEGORY-RELATED DOMAIN-DICTIONARY-LINKING WORD

[75] Inventors: Masayuki Yamada, Kawasaki; Yasunori Ohora, Yokohama; Yasuhiro Komori, Kawasaki, all of Japan

[73] Assignee: Canon Kabushiki Kaisha, Tokyo, Japan

[21] Appl. No.: 785,840

[22] Filed: Jan. 21, 1997

Related U.S. Application Data

[63] Continuation of Ser. No. 260,214, Jun. 14, 1994, abandoned.

[30] Foreign Application Priority Data

Jun. 16, 1993 [JP] Japan ............................ 5-144940

[51] Int. Cl.⁶ .................................................. G10L 5/06
[52] U.S. Cl. ............................ 704/10; 704/244; 704/251
[58] Field of Search ............................ 704/10, 244, 251

[56] References Cited

U.S. PATENT DOCUMENTS

| | | | |
|---|---|---|---|
| 4,618,984 | 10/1986 | Das et al. | 704/244 |
| 5,097,509 | 3/1992 | Lennig | 704/240 |
| 5,136,654 | 8/1992 | Ganong, III et al. | 704/238 |
| 5,220,629 | 6/1993 | Kosaka et al. | 704/260 |
| 5,315,689 | 5/1994 | Kawazawa | 704/238 |
| 5,384,892 | 1/1995 | Strong | 704/243 |
| 5,390,279 | 2/1995 | Strong | 704/200 |
| 5,497,319 | 3/1996 | Chong et al. | 704/2 |
| 5,535,120 | 7/1996 | Chong et al. | 704/3 |
| 5,640,490 | 6/1997 | Hansen et al. | 704/254 |

FOREIGN PATENT DOCUMENTS 0399452  11/1990  European Pat. Off. .......... G10L 5/06

*Primary Examiner*—David R. Hudspeth
*Assistant Examiner*—Tālivaldis Ivars Šmits
*Attorney, Agent, or Firm*—Fitzpatrick, Cella, Harper & Scinto

[57] ABSTRACT

A voice communication method includes the steps of inputting speech into an apparatus, recognizing the input speech using a first dictionary, predicting the category of an unrecognized word included in the input speech based on the recognition of the input speech in the recognition step, outputting a question to be asked to an operator requesting the operator to input a word which is included in the first dictionary and which can specify a second dictionary for recognizing the unrecognized word, based on the predicted category, and re-recognizing the unrecognized word with the second dictionary specified in response to the word inputted by the operator. The invention also relates to an apparatus performing these functions and to a computer program product instructing a computer to perform these functions.

30 Claims, 13 Drawing Sheets

| PLACE | SPA SITE NAME |
|---|---|
| 箱根町 (HAKONE TOWN) | 湯の花沢温泉 (YUNOHANAZAWA)<br>芦ノ湖温泉 (ASHINOKO)<br>姥子温泉 (UBAKO)<br>⋮ |
| 横浜市 (YOKOHAMA CITY) | 綱島温泉 (TUNASHIMA) |
| 厚木市 (ATSUGI CITY) | 飯山温泉 (IYAMA)<br>かぶと湯温泉 (KABUTOYU) |
| 湯河原町 (YUGAWARA TOWN) | 湯河原温泉 (YUGAWARA)<br>奥湯河原温泉 (OKUYUGAWARA) |
| ⋮ | ⋮ |

FIG. 9

| PLACE | SPA SITE NAME |
|---|---|
| 箱根町 (HAKONE TOWN) | 湯の花沢温泉 (YUNOHANAZAWA)<br>芦ノ湖温泉 (ASHINOKO)<br>姥子温泉 (UBAKO)<br>芦之湯温泉 (ASHINOYU)<br>大平台温泉 (OHIRADAI)<br>気賀温泉 (KIGA)<br>強羅温泉 (GORA)<br>小涌谷温泉 (KOWAKIDANI)<br>仙石原温泉 (SENGOKUBARA)<br>塔之沢温泉 (TONOZAWA)<br>底倉温泉 (SOKOKURA)<br>宮城野温泉 (MIYAGINO)<br>湯元温泉 (YUMOTO) |

FIG. 11

| INPUT SPEECH/PERCEPTION RESULT | INFORMATION OBTAINED | CANDIDATE WORD(S) FOR UNKNOWN | FUNCTION TO FOLLOW |
|---|---|---|---|
| 箱根町にある温泉を知りたい。 (I WOULD LIKE TO KNOW ABOUT SPA SITES IN HAKONE TOWN.) / (未知語)にある温泉を知りたい。 (I WOULD LIKE TO KNOW ABOUT SPA SITES IN (UNKNOWN).) | CATEGORY FOR SEARCH = SPA SITE<br>PLACE = UNKNOWN<br>CONTENTS = NAME | (なし) (NONE) | ASK PLACE (PREFECTURE NAME) |
| 神奈川県です。 (KANAGAWA PREFECTURE.) / 神奈川県です。 (KANAGAWA PREFECTURE.) | PLACE = KANAGAWA | 厚木市 (ATSUGI CITY)<br>箱根町 (HAKONE TOWN)<br>: | REEVALUATE |
| (NO INPUT)<br>箱根町にある温泉を知りたい。 (I WOULD LIKE TO KNOW ABOUT SPA SITES IN HAKONE TOWN.) | PLACE = HAKONE TOWN, KANAGAWA | | REPLY TO USER |

☐ : UNKNOWN, __ : REEVALUATION RESULT

FIG. 12

| INPUT SPEECH/PERCEPTION RESULT | INFORMATION OBTAINED | CANDIDATE WORD(S) FOR UNKNOWN | FUNCTION TO FOLLOW |
|---|---|---|---|
| 彫刻の森美術館の行き方を知りたい。<br>(I WOULD LIKE TO KNOW HOW TO GET TO CHOKOKUNOMORI ART MUSEUM.) /<br>(未知語) 美術館の行き方を知りたい。<br>(I WOULD LIKE TO KNOW HOW TO GET TO (UNKNOWN) ART MUSEUM.) / | CATEGORY FOR SEARCH<br>= ART MUSEUM<br>PLACE = UNKNOWN<br>CONTENTS<br>= HOW TO GET THERE | (なし) (NONE) | ASK PLACE |
| 神奈川県です。<br>(KANAGAWA PREFECTURE.) /<br>神奈川県です。<br>(KANAGAWA PREFECTURE.) / | PLACE = KANAGAWA | 横浜美術館<br>(YOKOHAMA ART MUSEUM)<br>彫刻の森美術館<br>(CHOKOKUNOMORI<br>ART MUSEUM)<br>⋮ | REEVALUATE |
| (NO INPUT) /<br>彫刻の森美術館の行き方を知りたい。<br>(I WOULD LIKE TO KNOW HOW TO GET TO CHOKOKUNOMORI ART MUNEUM.) | NAME = CHOKOKUNOMORI<br>ART MUSEUM | | REPLY TO USER |

☐ : UNKNOWN, ___ : REEVALUATION RESULT

FIG. 14

| CATEGORY OF UNKNOWN | ADDITIONAL CONDITION | ACTION TO FOLLOW |
|---|---|---|
| PLACE NAME | | ASK PREFECTURE NAME |
| PLACE NAME | PREFECTURE NAME : KNOWN | REQUEST ADDITIONAL CONDITION |
| NAME | CATEGORY FOR SEARCH : KNOWN | REQUEST ADDITIONAL CONDITION |
| NAME | CATEGORY FOR SEARCH : UNKNOWN | ASK CATEGORY FOR SEARCH |
| PLACE NAME & NAME | | ASK PREFECTURE NAME |
| ... | ... | ... |

FIG. 15

USR1 : 箱根町にある温泉を知りたい。 (I WOULD LIKE TO KNOW ABOUT SPA SITES IN HAKONE TOWN.)
SYS1 : 都道府県名を指定して下さい。 (PLEASE DESIGNATE PREFECTURE.)
USR2 : 神奈川県です。 (KANAGAWA PREFECTURE.)
SYS2 : 芦ノ湖温泉, 底倉温泉など, 合計で13件あります。 (THERE ARE 13 SPA SITES, INCLUDING ASHINOKO AND SOKOKURA.)

FIG. 16

VOCABULARY $HELLO = {おはよう(GOOD MORNING), こんにちは(GOOD AFTERNOON), (UNKNOWN)}
$PLACE = {東京都(TOKYO), ..., 千葉県(CHIBA), 箱根町(HAKONE TOWN), 湯河原町(YUGAWARA TOWN), ...,
          (未知語)マチ(UNKNOWN TOWN), (UNKNOWN)}
$FUNC_W = {に(NI), にある(BE IN), の(OF), を(ABOUT), について(ABOUT)}
$GENRE = {美術館(ART MUSEUM), 温泉(SPA), 水族館(AQUARIUM)}
$OBJECT = {行き方(HOW TO GET THERE), 電話番号(PHONE #), 住所(ADDRESS)}
$VERB = {知りたい(WOULD LIKE TO KNOW), 教えて(PLEASE SHOW ME), です(IS)}
$SUBJECT = {芦ノ湖温泉(ASHINOKO), 湯の花温泉(YUNOHANAZAWA), 姥子温泉(UBAKO), ...,
           (未知語)温泉(UNKNOWN SPA), (UNKNOWN)}

METHOD AND APPARATUS FOR RECOGNIZING PREVIOUSLY UNRECOGNIZED SPEECH BY REQUESTING A PREDICTED-CATEGORY-RELATED DOMAIN-DICTIONARY-LINKING WORD

This application is a continuation, of application Ser. No. 08/260,214 filed Jun. 14, 1994, now abandoned.

BACKGROUND OF THE INVENTION

1. Field of the Invention

The invention relates to method and apparatus for recognizing speech input by a speaker and for determining the intention of the speaker.

The invention also relates to a method and apparatus for recognizing a speech in consideration of the communication situation in which the speaker is involved.

2. Related Background Art i) Hitherto, in high efficiency speech perception in voice communication has been is realized by limiting the vocabulary the sentences, or the like which can be received. On the other hand, there is also a technique such that the user predicts words to be uttered next from the flow of communication, thereby effectively limiting the input vocabulary, sentences, or the like.

ii) There is also a technique that models vocabulary, sentences, and the like which cannot be accepted and using them together, in the case where the user utters the vocabulary, the sentences, or the like which cannot be accepted, such vocabulary and sentences can be detected.

iii) Hitherto, a technique has also been developed for prompting the user to again utter a word which cannot be recognized and the recognition process is changed for the speech which was again input.

According to the conventional technique (i), even if the speech which will be uttered next by the user is effectively predicted, the possibility that the user will utter another vocabulary, sentence, or the like which cannot be accepted still remains. Now, even if the models of the vocabulary, the sentence, and the like which cannot be accepted are used by the conventional technique (ii), when the user utters the vocabulary, sentence, or the like which cannot be accepted, the fact that "the user uttered vocabulary, sentence, or the like which cannot be accepted" can be merely detected and the word and the user uttered cannot be recognized. Therefore, after the acceptable vocabulary, the sentences, or the like are modified, the user needs to again utter the content which was once uttered in the past. In this case ease of use is lost.

According to the conventional technique (iii), the user must repeatedly utter the same word many times until the system can accurately perceive it, so that the ease of use is lost.

SUMMARY OF THE INVENTION

The invention intends to provide a voice communication method and apparatus in which the acceptable vocabulary is dynamically changed in accordance with the communication situation, and an unknown word, which cannot be recognized by the current acceptable vocabulary, is detected, and the unknown word is reevaluated by the acceptable vocabulary changed by the information obtained after speech including the unknown word which had been detected was input. Due to this, even when a vocabulary, a sentence, or the like which cannot be accepted is input, the recognition process progresses by reevaluating the past speech and the troublesomeness of requiring the user "after the acceptable vocabulary, sentence, or the like was changed, to again utter the words which had been once uttered is solved, and the ease of use improves.

According to the invention, the reevaluation of the unknown word portion is also executed with respect to the speech information before the unknown word, thereby enabling the perception to be accurately performed.

According to the invention, by extracting category information to which an unknown word belongs from speech information including such an unknown word, the unknown word can be reevaluated in a more certain range.

According to the invention, a communication situation is judged by the category information to which an unknown word belongs and which was extracted from speech information including the unknown word, thereby enabling the communication to be progress even in a situation such that the unknown word portion which cannot be perceived still remains.

According to the invention, a reply sentence requesting information from the user to identify the unknown word is determined in accordance with a communication situation obtained by analyzing speech information including such an unknown word, thereby making it possible to promote the user to utter a word or words in order to eliminate the unknown word when the communication is more advanced than that at the stage at which the speech information is input.

According to the invention, by extracting category information to which an unknown word belongs from such an unknown word, the unknown word can be more certainly reevaluated.

BRIEF DESCRIPTION OF THE DRAWINGS

FIG. 3 is a diagram showing an example of acceptable vocabulary, sentences, and the like;

FIG. 9 is a diagram showing an example of information obtained as a result of the data base search in the communication processing step S5;

FIG. 11 is a diagram showing an outline of the process in the embodiment shown in FIG. 1;

FIG. 12 is a diagram showing an outline of the process in the second embodiment;

FIG. 14 is a diagram showing an example of a table which is used to decide an action to follow in step S10 to determine how to process an unknown word;

FIG. 15 is a diagram showing an example of communication which is used for explanation of the embodiment shown in FIG. 1; and FIG. 16 is a diagram showing an example of vocabulary to know a category of an unknown word.

DETAILED DESCRIPTION OF THE PREFERRED EMBODIMENTS

|Embodiment 1|

An embodiment of the invention will now be described hereinbelow with reference to the drawings.

Figure 1:
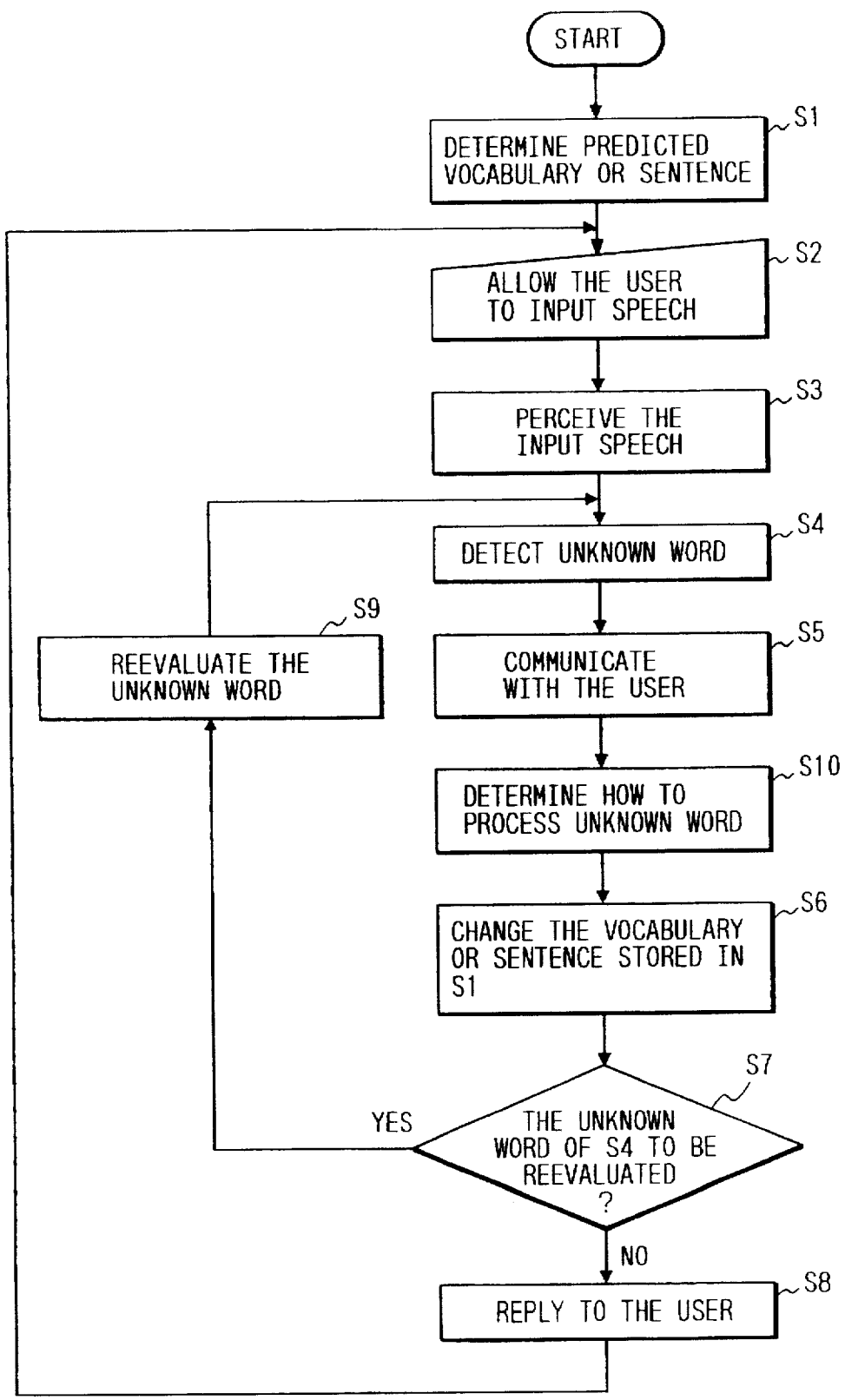
FIG. 1 is a flowchart showing a whole process of the embodiment.
Figure 2:
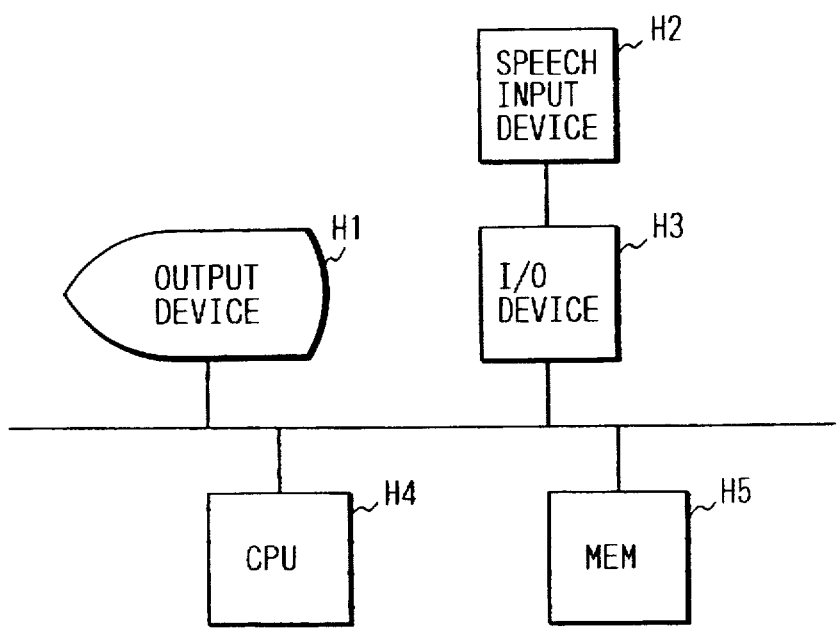
FIG. 2 is a block diagram showing a construction of an apparatus of the embodiment.

FIG. 1 is a flowchart showing the steps of an embodiment of the invention. FIG. 2 is a diagram showing a hardware construction in an embodiment of the invention. In FIG. 2, reference numeral H1 denotes an output device such as display device like a CRT display or the like or a speech synthesizing device; H2 denotes a speech input device such as a microphone or the like; H3 denotes I/O device to modify the speech which is input from the speech input device H2 so that it can be processed by a computer; and H4 denotes a central processing unit (CPU) for executing processes such as numerical value calculation, control, and the like. The CPU H4 controls each process in accordance with a control program stored in a memory device H5. H5 denotes the memory device such as an external memory device like a disk device or the like or internal memory like an RAM, ROM, or the like. The memory device H5 stores a dictionary of speech which is used for speech perception. A control program of processes shown in the flowcharts, which will be explained hereinbelow, has been stored in the memory device H5. Each of the above devices H1 to H5 is connected through a bus.

In consideration of the above hardware construction, an embodiment of the present invention will now be described with reference to the flowchart of FIG. 1.

When a signal to instruct the start of processes is input to the CPU H4, first, in step S1, a vocabulary, a sentence, or the like which is first uttered by the user is predicted and the predicted vocabulary, sentence, or the like is stored into the memory device H5. In step S2, the user inputs a speech as a perception target by using the speech input device H2.

In step S3, a speech perception operation is executed on the speech which was input in step S2 by using the vocabulary, sentence, or the like which was decided in step S1.

In step S4, a check is made to see whether or not an unknown word in which it is determined that the perception result is defective and that the word or the like which is derived as a perception result cannot be output is included in the speech which was input in step S2. Further, in the case where an unknown word is included, the position of the unknown word portion in the speech data which was modified by the I/O device H3 is detected and the position information or the speech data which was judged as an unknown word itself is stored in the memory device H5.

Figure 13:
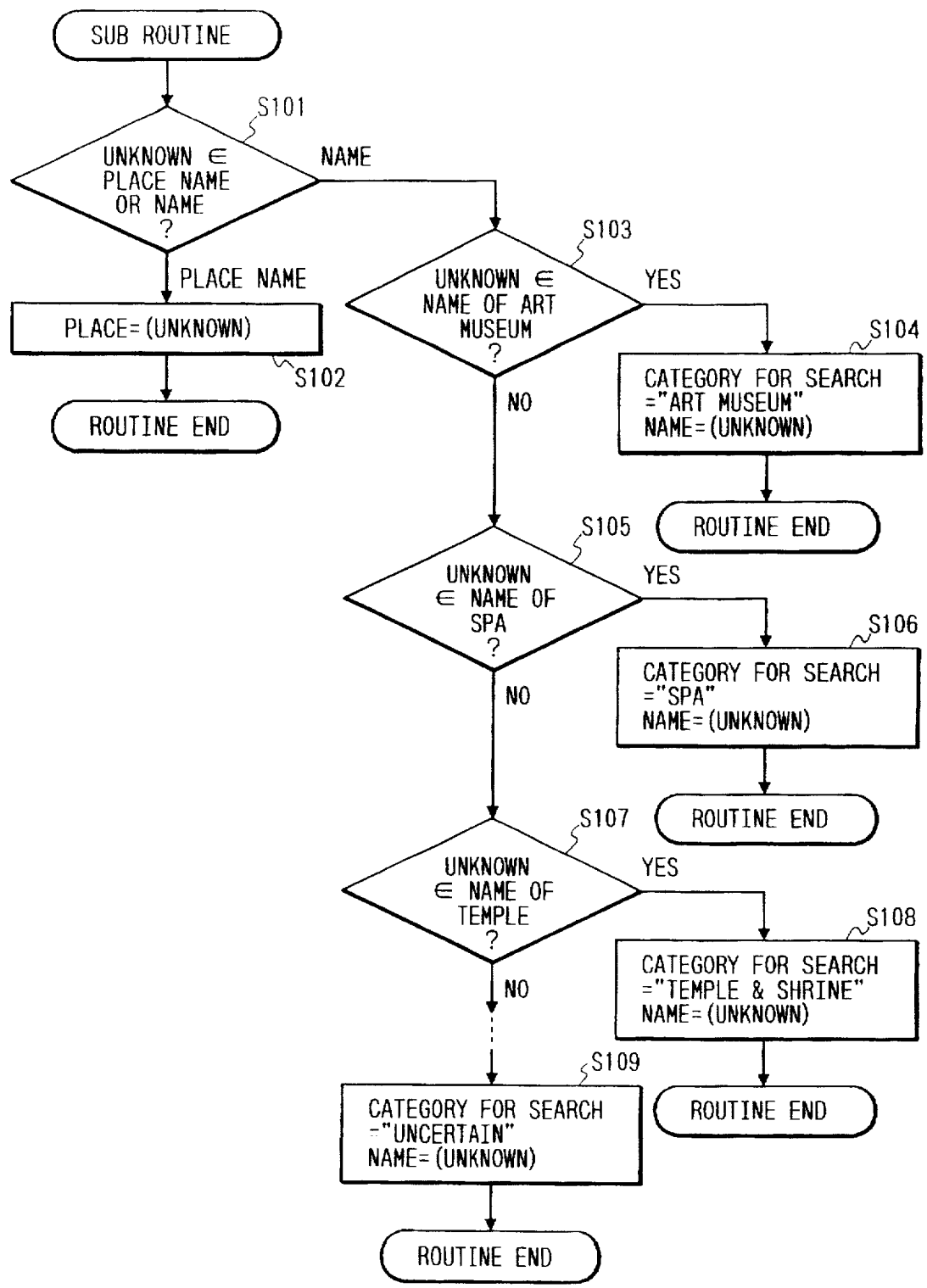
FIG. 13 is a diagram showing an example of a communication processing flow using a category to which an unknown word belongs in communication processing step S5.

In step S5, the results in steps S3 and S4 are analyzed, the speaking intention of the user is extracted, and a process such as a data base search or the like which the user intends to execute is performed in order to communicate to find the speaker's intention. In step S5, a process in the case where there is an unknown word when performing the process to extract the speaking intention in step S5 is shown in the flowchart of FIG. 13 and will be explained in detail hereinbelow.

In step S10, in the case where the unknown word is detected in step S4, a method for eliminating the unknown word and correctly perceiving the speech is decided or planned by using the result in step S5.

In step S6, the vocabulary, sentences, and the like which are perceived and have been stored in the memory device H5 in step S1 are changed by using the result in step S5.

In step S7, whether the unknown word portion detected in step S4 should be reevaluated or not is decided. In order to judge the necessity of the reevaluation, information indicating whether the unknown word has been detected in step S4 or not, and whether the acceptable vocabulary, sentence, or the like has been changed in step S6 or not, or the like is read out from the memory device H5 and is used. In the case where there is no unknown word as a result in step S7 or where there is an unknown word and it is determined that there is no need to change the acceptable vocabulary or sentence in step S6 and there is no need to reevaluate the unknown word portion, the processing routine advances to step S8. In the case where there is an unknown word and it is decided that the acceptable vocabulary or sentence has been changed in step S6 and it is necessary to reevaluate the unknown word portion, the processing routine advances to step S9.

In step S8, a reply to the user is calculated by using the results in steps S5 and S10 and is shown to the user by displaying it on the display screen or synthesizing speech and generating the reply as a sound or the like. After step S8, the processing routine is returned to step S2.

In the case where it is determined in step S7 that it is necessary to reevaluate the unknown word portion, the processing routine advances to step S9. In step S9, the unknown word portion detected in step S4 is reevaluated (namely, the speech perception of the unknown word portion is again executed) by using the acceptable vocabulary or sentence which was changed in step S6. After completion of step S9, the processing routine is returned to step S4.

As mentioned above, since whether or not an unknown word is included in the perception result is detected in step S4, a check is made to see if any other unknown word still remains or not in the result in step S9. In step S5, since a process appropriate to the result of speech perception is executed by using the result of the speech perception, in the case where the unknown word has already been eliminated in step S9, a process is executed by using new information of the portion in which the unknown word existed so far.

The above processing procedure will now be described by using a communication example shown in FIG. 15.

FIG. 15 shows a communication example such that since the user (usr) first utters a speech including the names of cities, towns, and villages which cannot be accepted for the first time because they are not in the acceptable vocabulary. Thus, when the user first utters "箱根町にある温泉を知りたい。(I WOULD LIKE TO KNOW ABOUT SPA SITES IN HAKONE TOWN.)", "箱根町 (HAKONE TOWN)" is perceived as an unknown word of a place name. The system (sys) asks the user a question to determine the appropriate data base so that the place name can be determined in response to it, thereby generating the answer which the user demands.

FIG. 11 is a table simply showing a state of data at each stage to process the communication of FIG. 15. The first line in FIG. 11 shows the result until "sys1" is uttered after "usr1" was input. The second line shows the result in which "usr2" was input. The third line shows a state when "sys2" is uttered.

The above data is stored and updated in the RAM of the memory device H5.

The detailed processes of the communication of FIG. 15 will now be described in accordance with the flowchart of FIG. 1.

Figure 3:
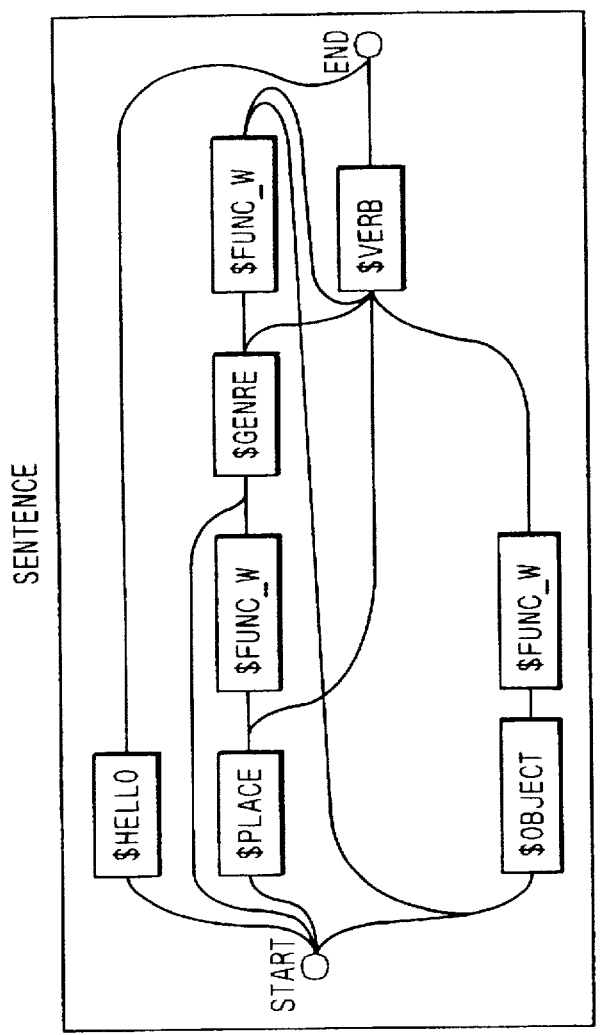

First, in step S1, a vocabulary or sentence which will be first uttered by the user is predicted and the acceptable vocabulary or sentence is determined. For example, the first acceptable vocabulary or sentence is as shown in FIG. 3. The meaning of the diagram of the sentence of FIG. 3 is that a sentence which traces paths from "start" to "end" is accepted. The meaning of the diagram of the vocabulary shows a vocabulary which can become "$hello" or the like in the sentence. Namely, おはよう (GOOD MORNING)", "東京都にある 美術館 の行き方を知りたい。(I WOULD LIKE TO KNOW HOW TO GET AN ART MUSEUM IN TOKYO.)" "電話 番号です。 (THIS IS THE PHONE #.)", and the like are sentences which can be accepted. On the other hand, (UNKNOWN) included in "$place" or the like in the diagram of the vocabulary in FIG. 3 is a symbol which indicates an unknown word and is provided to detect an unknown word in step S4. That is, it means "unknown word can enter here.".

In the next step S2, the user inputs speech. It is now assumed that the user inputs, for example, "箱根町にある 温 泉を知りたい。 (I WOULD LIKE TO KNOW ABOUT SPA SITES IN HAKONE TOWN.)" (usr1).

Figure 4:
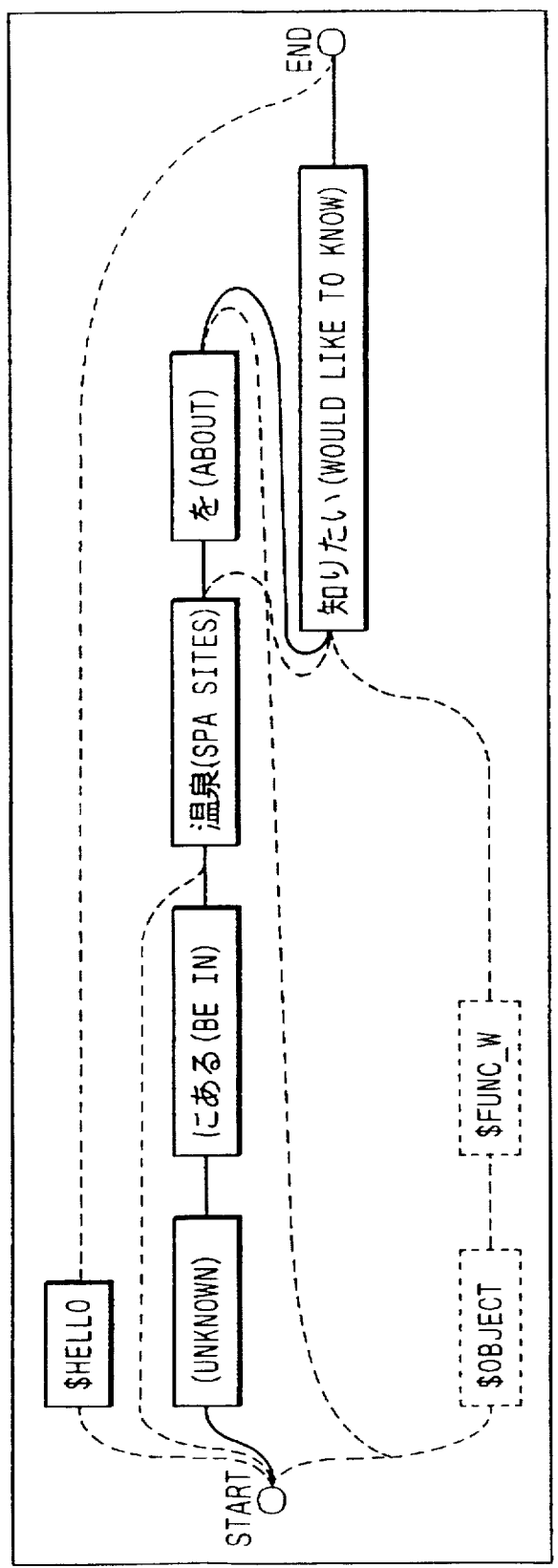
FIG. 4 is a diagram showing an example of paths obtained as a result in speech perceiving step S3.

In step S3, as a path (including vocabulary) on which the speech which was input in step S2 on the sentence decided in step S1, the optimum path which can obtain the speech that is acoustically nearest is calculated. The optimum path obtained is set to a perception result. In the above example, since the user utters " 箱根町にある 温 泉を知りたい。 (I WOULD LIKE TO KNOW ABOUT SPA SITES IN HAKONE TOWN.)", a path shown by a solid line in FIG. 4 is obtained as a perception result. "(未知語)にある 温 泉を知りたい。 (I WOULD LIKE TO KNOW ABOUT SPA SITES IN (UNKNOWN).)" is stored as a perception result of (usr1) as shown in FIG. 11.

Figure 5:
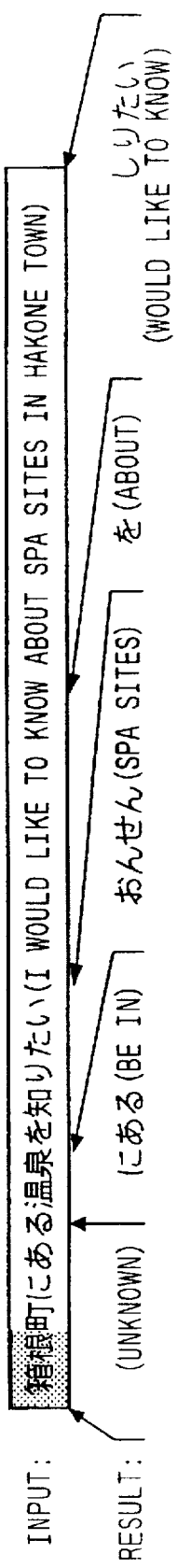
FIG. 5 is a diagram showing the correspondence between the speech and the perception result in the embodiment 1.

In step S4, a check is made to see if an unknown word is included in the speech which was input in step S2 or not on the basis of the result in step S3. As mentioned above, since "(unknown word)" is included in the perception result which was obtained and stored as a result in step S3, it can be judged that the unknown word is included in the speech which was input in step S2. The position (gray portion in FIG. 5) of the unknown word as shown in FIG. 5 is detected from the boundary of the vocabulary derived as a result in step S3.

In step S5, a speaking intention of the user is first extracted from the results in steps S3 and S4. The result in step S3 is "(未知語)にある 温 泉を知りたい。 (I WOULD LIKE TO KNOW ABOUT SPA SITES IN (UNKNOWN).)". From " 温 泉を知りたい。 (I WOULD LIKE TO KNOW ABOUT SPA SITES.)", the speaking intention is understood to be that "the search target of the user is spa sites.". Also, from " にある (BE IN)" of "(未知語)にある (BE IN (UNKNOWN))" the apparatus determines that the sentence has an annexed word indicative of the place, so that the apparatus determines that "although the user designates the place, it is unknown word.". The information obtained is stored as "information obtained" of "usr1" as shown in FIG. 11. As mentioned above, since the category to which the unknown word belongs is known, the speaking intention of the user is more finely extracted by using the category of the unknown word. The process for using the category of the unknown word is as shown in, for instance, a flowchart of FIG. 13. In step, S101, the category of the unknown word is determined from the word which continues to be the unknown word. That is, as already described above, since " にある (BE IN)" of "(未知語)にある [BE IN (UNKNOWN) ]" is the annexed word indicative of the place, it is determined that the unknown word is a word indicative of the place. In step S102, the information is stored as "information obtained" of "usr1". The processing routine Advances to step S6. The annexed word and condition for determination in step S101 are previously stored in the memory device H5, and are sequentially collated, thereby permitting a determining operation. The information of "place=(unknown)" indicates that "the place as a target to be searched by the user is handled as (unknown).", namely, "the subsequent processes are executed in accordance with the fact that the user designated the place and the designated place is unknown.". Subsequently, the process such as a data base search or the like which the user intends to perform is executed from the determined speaking intention. But first the apparatus determines from the speaking intention to "do nothing". This is because some condition or conditions must be added onto the search in order to search the spa sites from the data base and it the apparatus is designed to prompt the user to add these conditions.

In step S10, since the unknown word has been detected in step S4, an action to eliminate the unknown word is decided. Since it is known that the unknown word indicates the place name by the result in step S5 stored in the memory device H5, an action to eliminate the unknown word of the place name is determined. For example, in case of the place name, the detection of the place name as an unknown word indicates it is possible to predict that the place name which was uttered by the user is other than the names of prefectures (because the names of prefectures are always stored in the acceptable vocabulary in the embodiment). Therefore, it is determined that when the user designates the name of the prefecture, the unknown word can be eliminated. Therefore, the operation "ask the name of prefecture to the user." is performed. In order to decide the action to follow, for example, data for reference as shown in a table of FIG. 14 is stored in the memory device H5 and is referred in order to decide the action to follow from the unknown word category and additional condition in step S10.

Step S6 follows. However, since the data base search is not performed in step S5, the acceptable vocabulary or sentence is not changed.

In step S7, whether the unknown word portion is reevaluated or not is decided. As mentioned above, as a result in step S4, the unknown word exists in the speech which was input in step S2. However, since the acceptable vocabulary or sentence is not changed in step S6, it is determined that there is no need to reevaluate the unknown word portion. Thus, the processing routine advances to step S8.

In step S8, a proper reply is formed on the basis of the results in steps S5 and S10. The result in step S5 is the determination that "it is necessary to add conditions for data base search.". The action to follow which was obtained as a result in step S10 is to "ask the name of prefectures from the user.". For example, therefore, a reply sentence such as "都道府県名を指定して下さい。(PLEASE DESIGNATE THE NAME OF PREFECTURE.)" is output. After such a reply sentence is proposed, the processing routine is returned to step S2.

Figures 6, 7:
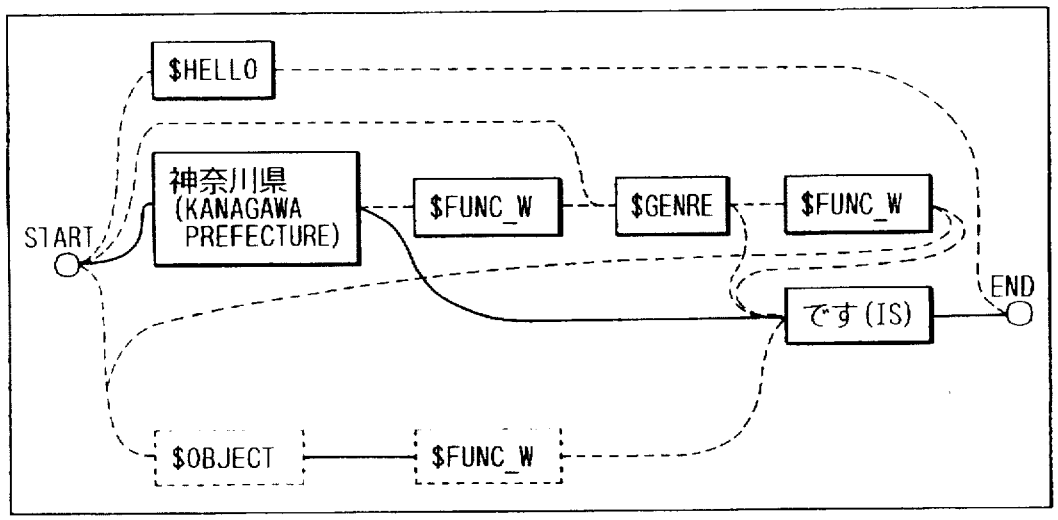
FIG. 6 is a diagram showing an example of paths obtained as a result in speech perceiving step S3.
FIG. 7 is a diagram showing an example of information obtained as a result of the data base search in communication processing step S5.

In step S2 again, an example of the user input at the second time assumes "神奈川県です。(IT IS KANAGAWA PREFECTURE.)" (usr2). The result in step S3 for such an input is as shown in FIG. 6 and is stored as a perception result of "usr2" as shown in FIG. 11.

Step S4 now follows. As mentioned above, since "unknown" is not included in the result in step S3, on unknown word is not detected.

In step S5, the speaking intention is first extracted from the result in step S3 and the result in step S5 from preceding time. As mentioned above, since the result in step S3 is "神奈川県です。(IT IS KANAGAWA PREFECTURE.)", information that "the place designated by the user is Kanagawa prefecture" is obtained and is additionally stored with the information which is obtained as shown in FIG. 11. As a result in step S5 at the preceding time, it is obtained that "the search target of the user is spa sites.". Therefore, "the spa sites located at places in Kananagawa prefecture." is searched from the data base. FIG. 7 shows an example of the result of the data base search. In the example, the places and names of spa sites in Kanagawa prefecture are searched.

In step S10, since no unknown word is detected in step S4, no such process to determine how to process the unknown word is performed.

Figure 8:
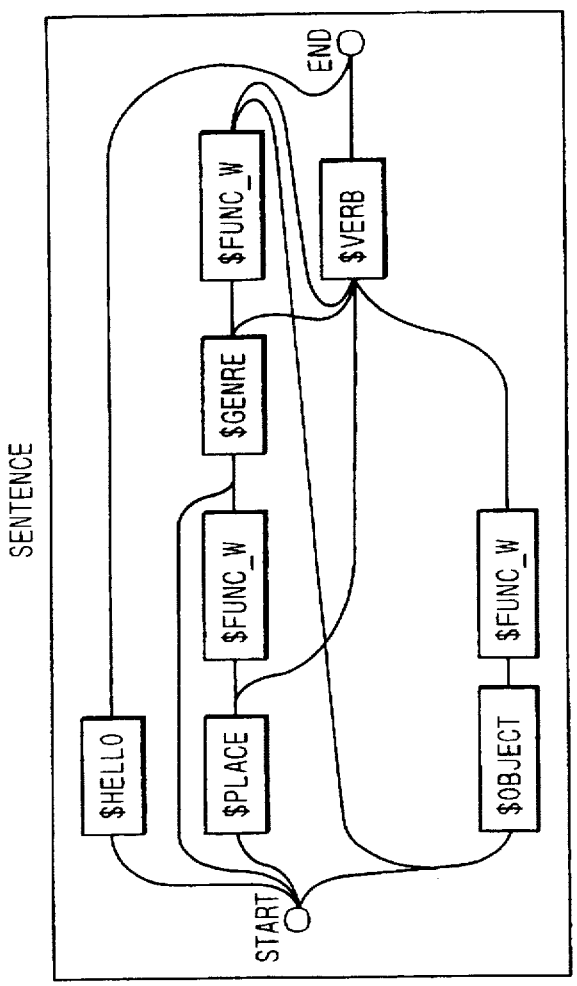
FIG. 8 is a diagram showing an example of an acceptable vocabulary, sentence, and the like which were changed as a result of the acceptable vocabulary or sentence changing step

In step S6, the acceptable vocabulary or sentence is changed on the basis of the result in step S5, namely, FIG. 7 in this case. For example, the names of cities, towns, and villages in which spa sites exist and the names of spa sites are shown in FIG. 7. The possibility that those vocabularies will be used in the speech perception after that is high. On the other hand, the names of spa sites are not clearly shown in FIG. 7, because the number of spa site names is large, such a large number of words makes it difficult to keep the number of acceptable words low. Therefore, as an example of the operation in step S6, the operation "the names of cities, towns, and villages in which spa sites exist are added to the predicted vocabulary" is executed. With respect to the sentence, since the name of city, town, or village can be used as it is as "$place", it is not changed. Consequently, a new acceptable vocabulary or sentence is as shown in FIG. 8.

The processing routine advances to step S7. First, since the unknown word exists in the speech "箱根町にある温泉を知りたい。(I WOULD LIKE TO KNOW ABOUT SPA SITES IN HAKONE TOWN.)" which was input in step S2 at the first time, there is a target for reevaluation. On the other hand, since the acceptable vocabulary has been changed in step S6 before, it is considered that the unknown word can be eliminated by reevaluating the unknown word portion by using the new acceptable vocabulary or sentence. Therefore, the processing routine advances to step S9.

In step S9, the unknown words which have been uttered so far are eliminated by the reevaluation by using the new acceptable vocabulary or sentence. In step S4 at the first time, the position of the unknown word has already been obtained (in FIG. 5). It has been known that the gray portion in FIG. 5 relates to the place. Therefore, the speech information at the position of the unknown word is read out from the memory device H5 and is matched with the vocabulary indicative of the place name which was newly added in step S6. The speech that is acoustically nearest to the gray portion in FIG. 5 is selected and is set to the result of the reevaluation of the unknown word. In the example, "箱根町 (HAKONE TOWN)" is obtained as a result in step S9. It will be understood that "箱根町 (HAKONE TOWN)" obtained here is acoustically near to the gray portion in FIG. 5 indicative of the unknown word.

In step S4, since there is no model indicative of the unknown word in the new speech perception result "箱根町にある温泉を知りたい。(I WOULD LIKE TO KNOW ABOUT SPA SITES IN HAKONE TOWN.)" obtained in step S9, a result "the unknown word is not detected" is obtained.

In step S5, the speaking intention that "the target place name of the user is Hakone town." is obtained from the new speech perception result "箱根町にある温泉を知りたい。(I WOULD LIKE TO KNOW ABOUT SPA SITES IN HAKONE TOWN.)" obtained in step S9. As a result in step S5 from the preceding time, information that "the search target of the user is spa site" has been obtained. Therefore, "spa sites located in Hakone town" are searched from the data base. An example of the result of the data base search is shown in FIG. 9. In the example, the places and names of the spa sites in HAKONE town are searched.

In the next step S10, no operation is performed because no unknown word is detected in step S4.

Figure 10:
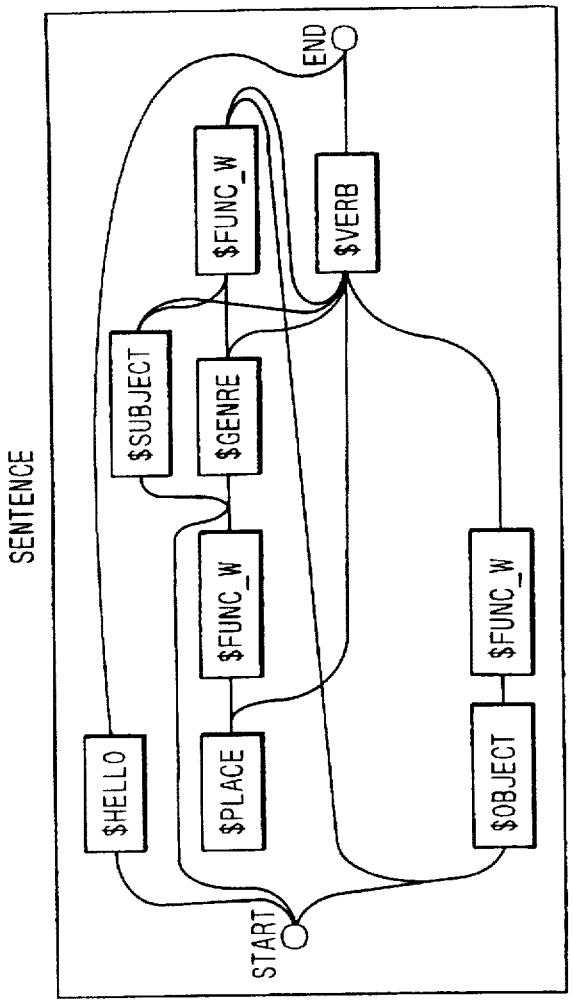
FIG. 10 is a diagram showing an example of an acceptable vocabulary, sentences, and the like which were changed as a result of the acceptable vocabulary or sentence changing step S6.

The acceptable vocabulary or sentence is subsequently changed on the basis of the result (FIG. 9) in step S5. Different from the case of FIG. 7, since the number of spa site names is small, the spa site names are added to the acceptable vocabulary. The sentence is also changed in association with the addition of the spa site names (proper nouns). As a result of the above processes, the new acceptable vocabulary or sentence is as shown in FIG. 10.

In step S7, since no unknown word is left in the speech which was input in the past, the processing routine advances to step S8.

As a result in step S5, the information (FIG. 9) which satisfies the request "場所が箱根町の温泉を知りたい。(I WOULD LIKE TO KNOW ABOUT SPA SITES LOCATED IN HAKONE TOWN.)" which the user intended is obtained. Therefore, in step S8, such information is output. For example, a reply such as "芦ノ湯温泉、底倉温泉など、合計で13件あります。(THERE ARE TOTAL 13 SPA SITES SUCH AS ASINOYU SPA, SOKOKURA SPA, ETC.)" (sys2) is proposed to the user.

After that, the processing routine again advances to step S2.

[Embodiment 2]

In the first embodiment, a format such as "unknown" has been used as a model indicative of the unknown word. However, particularly, in case of a proper noun or the like, the unknown word often has a character train indicative of the category of such a word in the end portion thereof. Therefore, a model such as "(unknown)+(word indicative of the category)" can be also used as a model showing the unknown word. For example, by possessing the model such as "(unknown)+(word indicative of the category)" as shown in FIG. 6 as a vocabulary, the category of the unknown word can be known together with the unknown word. Namely, by expressing the unknown spa site name by "(unknown) spa", it will be understood that the category of the unknown word is a spa site. The process to determine the category of the unknown word is executed in step S5 and is shown in detail in the flowchart of FIG. 13. In step S101, in the case where it is determined that the user designated the name in the portion of the unknown word from the characteristics of a word associated with the unknown word, step S103 follows. When the word associated with the unknown word is "美術館 (ART MUSEUM)", "category for search=art museum, name=(unknown)" is stored as "information obtained" of "usr1".

In the case where it is determined that the word associated with the unknown word is not "art museum" in step S103 and is determined that it is spa in step S105, "category for search=spa, name=(unknown)" is stored as "information obtained" of "usr1".

In the case where it is determined in step S105 that the word associated with the unknown word is not "spa" and is determined in step S107 that it is the word indicative of a temple or shrine, "category for search=temple & shrine, name=unknown" is stored as "information obtained" of "usr1".

By repeating the processes for determining "(unknown) +(word indicative of the category)" in steps S103, S105, and S107, if the answers are NO in all of those determining steps, as information of the unknown word, "category for search=(unknown), name=(unknown)" is stored as "information obtained" of "usr1" in step S109.

The category of the unknown word is known by the processes shown in FIG. 13 and the user doesn't need to again utter the category. The process shown in FIG. 12 will now be described. FIG. 12 relates to the processes in case of the following communication and in the case where there is a vocabulary such as "(unknown)+art museum".

usr1: 彫刻の 森美術館の行き方を知りたい。 (I WOULD LIKE TO KNOW HOW TO GET TO CHOKOKUNOMORI ART MUSEUM.)

sys1: 場所を指定ししてド下さい。 (PLEASE DESIGNATE THE PREFECTURE.)

Iusr2: 神奈川県です。 (KANAGAWA.)

SYS2: 彫刻の 森美術館の行き方は周 刻の 森駅 徒歩 分です。 (YOU CAN GET TO CHOKOKUNOMORI ART MUSEUM IN 2 MIN. ON FOOT FROM CHOKOKUNOMORI STATION.)

As another example of "(unknown)+(word indicative of the category)", it is possible to mention "(unknown) country club", "(unknown) prefecture" "(unknown) hotel", and the like.

[Embodiment 3]

In step S9 in the embodiment 1, only the the unknown word (gray portion in FIG. 5) has been reevaluated. However, the whole uttered speech including the unknown word can be also reevaluated by using the new acceptable vocabulary or grammar obtained in step S6. According to this method, an error of a vocabulary boundary due to the mixture of an unknown word can be corrected.

What is claimed is:

1. A voice communication method comprising the steps of:
    inputting speech into an apparatus;
    recognizing the input speech using a first dictionary;
    predicting the category of an unrecognized word included in the input speech based on the recognition of the input speech in said recognition step;
    outputting a question to be asked to an operator requesting the operator to input a word which is included in the first dictionary and which can specify a second dictionary for recognizing the unrecognized word, based on the predicted category; and
    re-recognizing the unrecognized word with the second dictionary specified in response to the word inputted by the operator.

2. A method according to claim 1, wherein said determining step determines the question in expectation that the operator will utter a word in the predicted vocabulary.

3. A method according to claim 2, further comprising the steps of:
    inputting additional speech into the apparatus comprising the word uttered by the operator in reply to the output question;
    recognizing the additional speech; and
    recognizing the unrecognized speech portion using a vocabulary predicted in response to a recognition made in said step of recognizing the additional speech.

4. A method according to claim 2, further comprising the steps of:
    inputting additional speech into the apparatus comprising the word uttered by the operator in reply to the output question;
    recognizing the additional speech; and
    recognizing the input speech using recognition results for the input speech and the additional speech.

5. A method according to claim 1, wherein said determining step determines the question in expectation that the operator will utter a word forming speech different from the unrecognized speech portion.

6. A method according to claim 1, wherein said predicting step predicts the vocabulary of the unrecognized speech portion from a sentence structure of a recognized speech portion.

7. A method according to claim 1, further comprising the steps of:
    deriving a plurality of sentence structures which can be formed by the input speech from a recognition result for the input speech; and
    selecting one of the plurality of derived sentence structures which is acoustically closest to the input speech.

8. A method according to claim 1, wherein said inputting step inputs the speech with a microphone.

9. A method according to claim 1, wherein said recognizing step recognizes the input speech using a memory storing a dictionary for speech recognition.

10. A method according to claim 1, further comprising the step of storing recognition results for the recognized speech portion and the unrecognized speech portion.

11. A speech communication apparatus comprising:
    input means for inputting speech into said apparatus;
    recognizing means for recognizing the speech input by said input means using a first dictionary;
    predicting means for predicting the category of an unrecognized word included in the input speech based on the recognition of the input speech by said recognizing means;
    outputting means for outputting a question to be asked of an operator requesting the operator to input a word which is included in the first dictionary and which can specify a second dictionary for recognizing the unrecognized word, based on the predicted category; and
    re-recognizing means for re-recognizing the unrecognized word with the second dictionary specified in response to the word inputted by the operator.

12. An apparatus according to claim 11. wherein said determining means determines the question in expectation that the operator will utter a word in the predicted vocabulary.

13. An apparatus according to claim 12. wherein said input means inputs additional speech comprising the word uttered by the operator in reply to the output question, wherein said recognizing means recognizes the input additional speech, and wherein said recognizing means recognizes the unrecognized speech portion using a vocabulary predicted in response to a recognition of the additional speech.

14. An apparatus according to claim 12. wherein said input means inputs additional speech comprising the word uttered by the operator in reply to the output question, wherein said recognizing means recognizes the additional speech. and wherein said recognizing means recognizes the input speech using recognition results for the input speech and the additional speech.

15. An apparatus according to claim 11. wherein said determining means determines the question in expectation that the operator will utter a word forming a speech different from the unrecognized speech portion.

16. An apparatus according to claim 11. wherein said predicting means predicts the vocabulary of the unrecognized speech portion from a sentence structure of a recognized speech portion.

17. An apparatus according to claim 11, further comprising:
- deriving means for deriving a plurality of sentence structures which can be formed by the input speech from a recognition result for the input speech; and
- selecting means for selecting one of the plurality of derived sentence structures which is acoustically closest to the input speech.

18. An apparatus according to claim 11. wherein said input means comprises a microphone.

19. An apparatus according to claim 11. further comprising means for storing a dictionary for speech recognition.

20. An apparatus according to claim 11 further comprising means for storing recognition results for the recognized speech portion and the unrecognized speech portion.

21. A computer program product comprising a computer usable medium having computer readable program code means embodied in said medium for enabling speech communication by a computer, said computer program product comprising:
- first computer readable program code means for causing said computer to input speech thereinto;
- second computer readable program code means for causing said computer to recognize the input speech using a first dictionary;
- third computer readable program code means for causing said computer to predict the category of an unrecognized word included in the input speech based on the recognition of the input speech caused by said second computer readable program code means;
- fourth computer readable program code means for causing said computer to output a question to be asked of an operator requesting the operator to input a word which is included in the first dictionary and which can specify a second dictionary for recognizing the unrecognized word. based on the predicted category; and
- fifth computer readable program code means for causing said computer to re-recognize the unrecognized word with the second dictionary specified in response to the word inputted by the operator.

22. A computer program product to claim 21. wherein said fourth computer readable program code means causes said computer to determine the question in expectation that the operator will utter the word.

23. A computer program product according to claim 21, wherein said first computer readable program code means causes said computer to input additional speech comprising the word uttered by the operator in reply to the output question, wherein said second computer readable program code means causes said computer to recognize the input additional speech. and wherein said second computer readable program code means causes said computer to recognize the unrecognized word using a vocabulary predicted in response to recognition of the additional speech.

24. A computer program product according to claim 21. wherein said first computer readable program code means causes said computer to input additional speech comprising the word uttered by the operator in reply to the output question, wherein said second computer readable program code means causes said computer to recognize the additional speech. and wherein said second computer readable program code means causes said computer to recognize the input speech using recognition results for the input speech and the additional speech.

25. A computer program product according to claim 21, wherein said fourth computer readable program code means causes said computer to determine the question in expectation that the operator will utter a word forming a speech different from the unrecognized word.

26. A computer program product according to claim 21. wherein said third computer readable program code means causes said computer to predict the unrecognized word from a sentence structure of the recognized input speech.

27. A computer program product according to claim 21. further comprising:
- sixth computer readable program code means for causing said computer to derive a plurality of sentence structures which can be formed by the input speech from a recognition result for the input speech; and
- seventh computer readable program code means for causing said computer to select one of the plurality of derived sentence structures which is acoustically closest to the input speech.

28. A computer program product according to claim 21. wherein said first computer readable program code means causes said computer to input speech using a microphone.

29. A computer program product according to claim 21, further comprising means for storing the first and second dictionaries.

30. A computer program product according to claim 21, further comprising sixth computer readable program code means for causing said computer to store recognition results for the recognized speech and the unrecognized word.

* * * * *

UNITED STATES PATENT AND TRADEMARK OFFICE
CERTIFICATE OF CORRECTION

PATENT NO. : 5,797,116

DATED : August 18, 1998

INVENTOR(S): MASAYUKI YAMADA, ET AL.

Page 1 of 3

It is certified that error appears in the above-identified patent and that said Letters Patent is hereby corrected as shown below:

Column 1

Line 20, delete "in" (first occurrence).
    Line 21, delete "is".
    Line 22, "vocabulary" should read --vocabulary,--.
    Line 47, "and the user" should read --the user--.

Column 2

Line 3, " "after " should read --after--.
    Line 20, "be" should be deleted.
    Line 57, "step" should read --step S6;--.

Column 5

Line 25, "GET" should read --GET TO--; and "TOKYO.)" " should read --TOKYO.)",--.

UNITED STATES PATENT AND TRADEMARK OFFICE
CERTIFICATE OF CORRECTION

PATENT NO.  : 5,797,116
DATED       : August 18, 1998
INVENTOR(S) : MASAYUKI YAMADA, ET AL.

It is certified that error appears in the above-identified patent and that said Letters Patent is hereby corrected as shown below:

Column 6

Line 19, "Advances" should read --advances--.
    Line 34, delete "it".
    Line 45, "(because" should read --because--.
    Line 46  "embodiment)" should read --embodiment--.

Column 7

Line 15, "on" should read --an--.
    Line 18, "from" should read --from the--.
    Line 41, "large," should read --large, and--.

Column 9

Line 40, "Iusr2" should read --usr2--.
    Line 41, "SYS2" should read --sys2--.
    Line 50, "the the" should read --the--.

UNITED STATES PATENT AND TRADEMARK OFFICE
CERTIFICATE OF CORRECTION

PATENT NO. : 5,797,116

DATED : August 18, 1998

INVENTOR(S) : MASAYUKI YAMADA, ET AL.

It is certified that error appears in the above-identified patent and that said Letters Patent is hereby corrected as shown below:

Column 12

Line 7, change "product" to --product according--.

Signed and Sealed this

Thirty-first Day of August, 1999

Attest:

Q. TODD DICKINSON

*Attesting Officer*  *Acting Commissioner of Patents and Trademarks*